US011975711B2

(12) United States Patent
Manav

(10) Patent No.: US 11,975,711 B2
(45) Date of Patent: May 7, 2024

(54) METHOD FOR THE GEOMETRIC REPRESENTATION OF A VEHICLE AREA OF A VEHICLE FOR THE PURPOSE OF COLLISION DETECTION

(71) Applicant: AVL Software and Functions GmbH, Regensburg (DE)

(72) Inventor: Canberk Manav, Regensburg (DE)

(73) Assignee: AVL Software and Functions GmbH, Regensburg (DE)

( * ) Notice: Subject to any disclaimer, the term of this patent is extended or adjusted under 35 U.S.C. 154(b) by 274 days.

(21) Appl. No.: 17/718,613

(22) Filed: Apr. 12, 2022

(65) Prior Publication Data

US 2022/0332314 A1    Oct. 20, 2022

(30) Foreign Application Priority Data

Apr. 16, 2021  (DE) .................... 10 2021 109 661.8

(51) Int. Cl.
*B60W 30/095* (2012.01)
*B60W 30/09* (2012.01)
*B60W 40/12* (2012.01)
*G06V 20/58* (2022.01)

(52) U.S. Cl.
CPC ........ *B60W 30/0956* (2013.01); *B60W 30/09* (2013.01); *B60W 40/12* (2013.01); *G06V 20/58* (2022.01); *B60W 2420/403* (2013.01); *B60W 2422/95* (2013.01); *B60W 2530/201* (2020.02); *B60W 2554/20* (2020.02); *B60W 2554/40* (2020.02); *B60W 2554/80* (2020.02)

(58) Field of Classification Search
CPC ........................ B60W 2530/201; B60W 30/09
See application file for complete search history.

(56) References Cited

U.S. PATENT DOCUMENTS 9,969,386 B1 * 5/2018 Wang ................... B62D 15/027
2020/0130696 A1 * 4/2020 Xiao ................. B60W 30/0953

FOREIGN PATENT DOCUMENTS

| CN | 110696823 A | | 1/2020 | |
| CN | 111591288 A | | 8/2020 | |
| CN | 111591288 A | * | 8/2020 | .......... B60W 30/095 |

OTHER PUBLICATIONS

Machine Translation of Huo's reference (CN-111591288-A) (Year: 2020).*

(Continued)

*Primary Examiner* — Tarek Elarabi
(74) *Attorney, Agent, or Firm* — Rogue.law; Laura Schneider

(57) ABSTRACT

A method for the geometric representation of a vehicle area (1) of a vehicle for the purpose of collision detection, wherein the vehicle area (1) has a boundary (2), comprising the method steps of performing a medial axis transformation of the vehicle area (1) to generate a vehicle area skeleton (4) and performing a point classification of points of the vehicle area skeleton (4) to determine front corner region points (5, 6) and rear corner region points (7, 8), and a front wheelbase point (9) and a rear wheelbase point (10), and also performing a circle decomposition of the vehicle area (1), wherein each circle of the circle decomposition has a maximum area exceedance value (17).

9 Claims, 9 Drawing Sheets

(56) References Cited

OTHER PUBLICATIONS

Dr. Lu, Office Action for German Patent Application No. 10 2021 109 661.8, Nov. 19, 2021, 7 pages, DPMA, Munich, Germany. No English translation available.

Julius Siegler and Christoph Stiller, "Fast Collision Checking for Intelligent Vehicle Motion Planning," Jun. 21-24, 2010, 2010 IEEE Intelligent Vehicles Symposium, University of California, 5 pages, Department of Measurement and Control, Karlsruhe Institute of Technology, San Diego, Ca, USA.

* cited by examiner

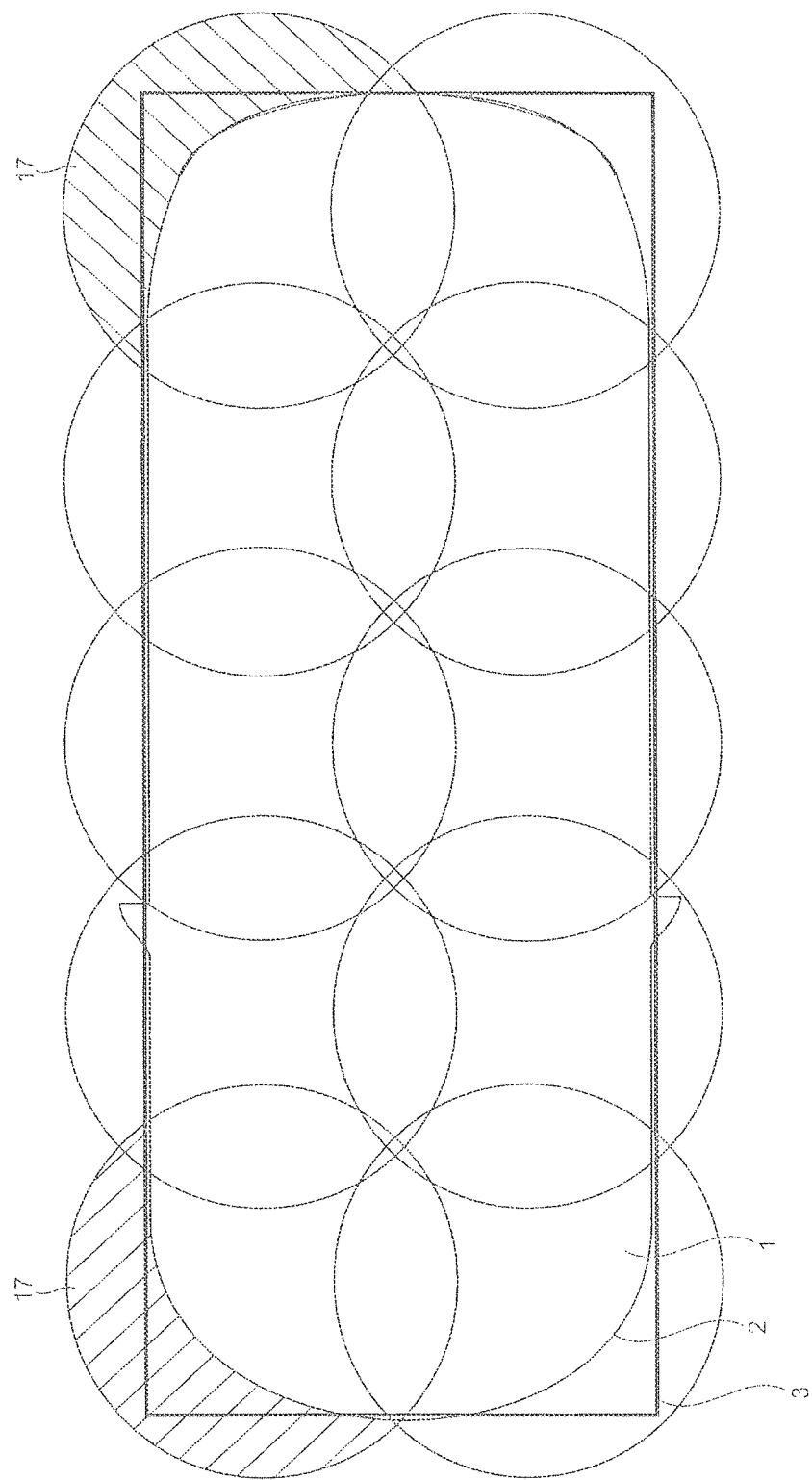
Fig. 1 -- Prior Art --

METHOD FOR THE GEOMETRIC REPRESENTATION OF A VEHICLE AREA OF A VEHICLE FOR THE PURPOSE OF COLLISION DETECTION

CROSS-REFERENCE TO RELATED APPLICATION

This application claims priority to German Patent Application No. 10 2021 109 661.8 filed on Apr. 16, 2021 and entitled "Method for the geometric representation of a vehicle area of a vehicle for the purpose of collision detection," the entire disclosure of which is incorporated herein by reference for all proper purposes.

The invention relates to methods for the geometric representation of a vehicle area of a vehicle for the purpose of collision detection, wherein the vehicle area has a boundary.

Geometric representations of vehicle areas are known from the prior art. The vehicle area is enclosed by a bounding box, which is a rectangle, and this bounding box is decomposed and covered by a fixed number of circles having fixed radii. A method of this type can be found in the prior art in FIG. 1.

A decomposition of this type consequently results in a large overflow, such that in a collision detection ("collision estimation" or "collision detection"), a region of an occupancy map resulting from the decomposition appears to be occupied, which in reality is not.

This is disadvantageous, for example, in the case of parking assistants or the like.

It is accordingly the object of the present invention to specify a method which overcomes the disadvantages of the prior art and which provides improved collision detection.

This object is achieved by a method having the features of claim 1.

The core idea of the invention is to provide a method for the geometric representation of a vehicle area of a vehicle, for the purpose of collision detection, wherein the vehicle area has a boundary, comprising the method steps of:

(a) performing a medial axis transformation of the vehicle area to generate a vehicle area skeleton, and performing a point classification of points of the vehicle area skeleton to determine front corner region points and rear corner region points, and a front wheelbase point and a rear wheelbase point;

(b) performing a circle decomposition of the vehicle area, wherein each circle of the circle decomposition has a maximum area exceedance value, including:

(i) (I) generating a first circle, the center of which is the front wheelbase point and which has a first radius, and generating a second circle, the center of which is the rear wheelbase point and which has the first radius; wherein the connection between the front and rear wheelbase points corresponds to a first skeleton connecting line;

(II) performing a verification step to determine whether an area of the vehicle area assigned to the first skeleton connecting line, with the rear and front wheelbase points as end points, is completely covered;

(III) if the verification step is negative, generating an n-th circle, where n=3, ..., on the first skeleton connecting line, with the first radius; incrementing n and performing step (II) again;

(ii) proceeding from the front wheelbase point towards an $n_v$-th front corner region point, $n_v$=1, 2, ..., along an $n_v$-th front skeleton connecting line between the front wheelbase point and the $n_v$-th front corner region point;

(I) generating an $n_v$-th front circle on the $n_v$-th front skeleton connecting line, with a minimum radius, and iteratively adapting the minimum radius of the $n_v$-th front circle until the maximum area exceedance value condition is satisfied;

(II) performing a verification step to determine whether an area of the vehicle area assigned to the nv-th front skeleton connecting line is completely covered;

(III) if the verification step is negative, generating an $(n_v+1)$-th front circle, with the minimum radius, on the $n_v$-th front skeleton connecting line, and iteratively adapting the minimum radius of the $(n_v+1)$-th front circle until the maximum area exceedance value condition is satisfied, incrementing $n_v$, and performing step (II) again;

(iii) proceeding from the rear wheelbase point towards an $n_h$-th rear corner region point, $n_h$=1, 2, ..., along an $n_h$-th rear skeleton connecting line between the rear wheelbase point and the $n_h$-th rear corner region point;

(I) generating an $n_h$-th rear circle with the minimum radius and iteratively adapting the minimum radius of the $n_h$-th rear circle until the maximum area exceedance value condition is satisfied;

(ii) performing a verification step to determine whether an area of the vehicle area assigned to the $n_h$-th rear skeleton connecting line is completely covered;

(III) if the verification step is negative, generating an $(n_h+1)$-th rear circle with the minimum radius on the n-th rear skeleton connecting line and iteratively adapting the minimum radius of the $(n_h+1)$-th rear circle until the maximum area exceedance value condition is satisfied, incrementing $n_h$ and performing step (II) again.

The term "vehicle area" means the area that the vehicle occupies when the vehicle is viewed from above. According to the invention, the vehicle area has a boundary or edge which encloses the vehicle area.

The minimum radius can be prespecified, the minimum radius being the smallest possible radius for the respective circle. Radii below the minimum radius are not provided. The adaptation of the minimum radius in this case is one in which the value of the radius is increased, for example incremented, until the area exceedance value condition is satisfied. Provision is preferably made for the radius to be smaller than or equal to the first radius, which means that: minimum radius≤radius≤first radius.

The methodology of medial axis transformation is sufficiently known from the prior art. Performing a medial axis transformation results in the skeleton—in this case, the vehicle area skeleton according to the invention.

The vehicle area skeleton is formed from a multiplicity of points, wherein, according to the invention, a proportion of the points is classified by performing a point classification according to the invention, wherein points of the vehicle area skeleton are classified by means of the point classification as front corner region points, rear corner region points, and a front wheelbase point and a rear wheelbase point.

According to a preferred embodiment, it is provided that the point classification is performed from a prespecified vehicle center in such a way that the points with the greatest distances from the vehicle center are defined as the corner region points, and the points of the vehicle center which constitute a Y node or are arranged close to a Y node are defined as the wheelbase points.

The term "vehicle center", indicated by the coordinates $(x_c, y_c)$, is used to mean an average of the skeleton points, wherein the set of skeleton points $P_s(x_s, y_s)$, represented by:

$$(x_c, y_c) = \left(\frac{x_{s,max} + x_{s,min}}{2}, \frac{y_{s,max} + y_{s,min}}{2}\right),$$

where $x_{s,max}$ is the maximum value and $x_{s,min}$ is the minimum value of the x-coordinate, and $y_{s,max}$ is the maximum value and $y_{s,min}$ is the minimum value of the y-coordinate.

The term "Y node" is used to designate the point at which the lines of the Y meet.

In addition, further points may be classified which correspond to lateral corner region points which correspond to the position of the mirrors of the vehicle. The lateral corner region points are those points which are at a distance from the center of the vehicle and do not correspond to any other corner region point.

The term "area exceedance value" is used to mean that a circle which covers a portion of the vehicle area has an area portion which does not cover any portion of the vehicle area. This area portion corresponds to an area exceedance value, which according to the invention is allowed to assume a maximum value. The area portion can consist of a single area or of several partial areas.

The fact that a given circle of the circle decomposition has such an area exceedance value means that parts of the given circle lie outside the boundary of the vehicle area, and therefore intersect the boundary.

A memory unit and a computing unit are particularly preferably provided in the vehicle or connected to the vehicle. The memory unit is preferably provided and designed so that the vehicle area is stored therein, and the results of each of the method steps can be stored—that is, the vehicle area skeleton from the medial axis transformation and the point classification with the resulting classified points. The same also applies to the circle decomposition and to further embodiments. The computing unit is preferably provided and designed to carry out the method steps—that is, to carry out the medial axis transformation, the point classification and the circle decomposition—wherein further method steps of further embodiments can also be carried out by the computing unit. More preferably, the computing unit is connected to the memory unit in a manner allowing signaling, in such a way that the computing unit can read out required parameters and can store the result of operations in the memory unit.

According to the invention, the circle decomposition is performed as described above, proceeding from the first circle and the second circle.

According to a preferred embodiment, the first radius is such that the first radius corresponds to a maximum and/or maximum-permitted radius. More preferably, the first radius is dependent on the vehicle width and on the maximum area exceedance value.

In order to fulfil the specification of the maximum area exceedance value, it is provided that the first radius is greater than half the vehicle width, and/or the diameter is greater than the vehicle width. The vehicle width can be the width of the vehicle without the exterior mirrors—that is, for example from one lateral surface to the other lateral surface. It can also be contemplated that the vehicle width is defined with the exterior mirrors.

The first radius is determined by the width of the vehicle, preferably without taking into account the exterior mirrors, the maximum permitted area exceedance value and the grid resolution. As an example, given a vehicle width of 2.06 m and a grid resolution of 0.1 m, the first radius is selected as 2.1 m, in order to cover the width of the vehicle while still satisfying the grid resolution constraint.

The maximum area exceedance value can therefore be an adjustable parameter for the quality of the proposed method. The maximum area exceedance value should preferably be greater than or equal to (first radius−vehicle width)/2. This gives the maximum area exceedance value for the defined n-th circles.

If the greater than or equal to condition (first radius−vehicle width)/2 cannot be met, the grid resolution should be adjusted—although this may slow down the method.

The fact that the exterior mirrors should preferably be disregarded means that no overly large n-th circles are provided solely for the purpose of covering the side regions that are assigned to the exterior mirrors, resulting in the need to select an area exceedance value which is too large.

According to the invention, a verification step is provided during or after each generation of the circles, in order to verify whether the entire vehicle area is covered. The verification step is preferably carried out by means of the computing unit.

According to a further embodiment, it is provided that when the point classification is performed, a first and a second lateral corner region point are defined, wherein the connecting line between the first and the second lateral corner region point corresponds to a lateral skeleton connecting line, wherein the first skeleton connecting line and the lateral skeleton connecting line intersect at a first point, wherein a first lateral skeleton connecting line is formed by the skeleton connecting line between the first point and the first corner region point, and a second lateral skeleton connecting line is formed by the skeleton connecting line between the first point and the second corner region point, wherein, proceeding from the first point towards the first lateral corner region point along the first lateral skeleton connecting line, or proceeding from the first point towards the second lateral corner region point along the second lateral skeleton connecting line:

(I) generating an $n_s$-th lateral circle on the first or second lateral skeleton connecting line with the minimum radius, and iteratively adapting the minimum radius of the $n_s$-th lateral circle until the maximum area exceedance value condition is satisfied;

(II) performing a verification step to determine whether an area of the vehicle area assigned to the first or second lateral skeleton connecting line is completely covered;

(III) if the verification step is negative, generating an $(n_s+1)$-th lateral circle with the minimum radius on the first or second lateral skeleton connecting line, and iteratively adapting the minimum radius of the $(n_s+1)$-th lateral circle until the maximum area exceedance value condition is satisfied, incrementing $n_s$, and performing step (II) again.

The lateral corner region points can preferably be the exterior mirrors, since these represent the outermost points of the vehicle in the lateral direction.

If there are side mirrors on the vehicle, then these are taken into account in the medial axis transformation, such that a corresponding skeleton connecting line is also provided there in order to describe the assigned area.

The process of covering the lateral skeleton connecting lines is carried out in the same way as for the previous skeleton connecting lines.

Before carrying out a circle covering process of the lateral skeleton connecting lines, a verification step is preferably carried out to determine whether the lateral skeleton connecting lines are already covered by other circles. If this is the case, a new circle covering process need not be carried out. If the verification step is negative—that is, the lateral skeleton connecting lines are not yet covered—then the process of covering the lateral skeleton connecting lines is carried out.

According to a further embodiment, it is provided that, in the event of a negative verification step, the third circle is determined proceeding from the first circle, wherein the first circle intersects the boundary at a minimum of four points of intersection, wherein a first point of intersection and a second point of intersection are opposite each other with respect to the first skeleton connecting line, and wherein a center of the third circle is determined by means of the first and the second point of intersection;

or, in the event of a negative verification step, the third circle is determined proceeding from the second circle, wherein the second circle intersects the boundary at a minimum of four points of intersection, wherein a first point of intersection and a second point of intersection are opposite each other with respect to the first skeleton connecting line, and wherein a center of the third circle is determined by means of the first and the second point of intersection;

and wherein, in the event of a repeated negative verification step, the (n+1)-th circle is determined proceeding from the n-th circle, wherein the n-th circle intersects the boundary at a minimum of four points of intersection, wherein a first point of intersection and a second point of intersection are opposite each other with respect to of the first skeleton connecting line, and wherein a center of the (n+1)-th circle is determined by means of the first point of intersection and the second point of intersection.

The center of the third circle can be determined by the points of intersection of the first circle or of the second circle, and the third circle can be generated accordingly.

In the case of a further repeated negative verification step, an n=4th circle must therefore be generated, and is generated depending on the points of intersection of the third circle with the boundary. This also applies to all subsequent circles with regard to the first skeleton connecting line.

It is irrelevant in this case whether the n=3, . . . -th circles are generated from the first circle or the second circle.

According to a further embodiment, it is provided that, proceeding from the first circle, a first front circle is determined, wherein the first circle intersects the boundary at a minimum of four points of intersection, wherein a third point of intersection and a fourth point of intersection are opposite each other with respect to a first front skeleton connecting line, wherein a center of the first front circle is determined by means of the third and the fourth point of intersection, and wherein, in the event of a negative verification step, the $(n_v+1)$-th circle is determined proceeding from the $n_v$-th circle, wherein the $n_v$-th circle intersects the boundary at a minimum of two points of intersection, wherein a first point of intersection and a second point of intersection are opposite each other with respect to the first front skeleton connecting line, and wherein a center of the $(n_v+1)$-th circle is determined by means of the first point of intersection and the second point of intersection.

The process of covering the area assigned to the first front skeleton connecting line is carried out until the assigned area is completely covered.

A circle is determined when the maximum area exceedance value condition is satisfied. This means that if the corresponding region is not yet completely covered, a new circle is determined accordingly until the region is completely covered.

An analogous procedure is provided with regard to the rear skeleton connecting lines. The same applies to the lateral skeleton connecting lines.

According to a further preferred embodiment, it is provided that the circle decomposition has a total area exceedance value with respect to the vehicle area, wherein the total area exceedance value is dependent on the maximum area exceedance value for each circle, a grid resolution, and a minimum radius for each circle.

It can preferably be provided that the total area exceedance value has a minimum value, which can be prespecified. This minimum value can be selected depending on the design and application.

The grid resolution is preferably between 5 cm and 50 cm, particularly preferably between 10 cm and 30 cm, and particularly preferably 10 cm.

The minimum radius for each circle is also dependent on the grid resolution.

The grid resolution must be taken into account in particular when, according to a further embodiment, it is provided that, after the circle decomposition has been performed, each circle is decomposed into rectangles in such a way that each circle is covered by rectangles.

The minimum radius in this case must be selected in such a way that a circle can be represented by at least two rectangles.

More preferably, when the vehicle moves, an occupancy map (or "collision map" or "collision map grid"), in particular an integral image of an occupancy map, is calculated, wherein the movement of the vehicle results in the application of a transformation matrix to each circle, wherein each rectangle is checked for occupancy within a predefined time segment by means of rapid collision detection.

Rapid collision detection can be carried out by a rectangle decomposition of the circle decomposition, since the corresponding calculation which must be carried out is considerably simplified.

The environmental collision check is performed by means of the method based on circle-rectangle decomposition, in which the shape of the vehicle is first decomposed into circles and then into rectangles.

Due to the rotational invariance of circles, it is only necessary to transform the circle centers based on the updated vehicle position, and all decomposition rectangles of circles are localised based on the updated circle centers, with the fixed orientation aligned to the open space map of the environment. In order to check the occupancy of the rectangles more quickly, an integral image of the occupancy map is calculated at each time frame, due to the update of the occupancy, as described below:

$$I_o(X, Y) = \sum_{x \leq X, y \leq Y} o(x, y)$$

With the integral image $I_0$ the occupancy of a rectangular region in the occupancy map can be easily checked by the following arithmetic equation:

$$\sum_{x,y \in A} o(x, y) = I_o(x_0, y_0) + I_o(x_1, y_1) - I_o(x_0, y_1) - I_o(x_1, y_0)$$

wherein the rectangle presents no collision if $\Sigma_{x,y \in A} o(x,y) = 0$. This check is therefore carried out for each of the decomposition rectangles for each pose or position of the vehicle along a trajectory.

If the value of the sum above is greater than zero, then the rectangle is occupied, indicating a possible collision. The two equations (calculation of the integral image once for each image update and calculation of the rectangle occupancy for each rectangle of the circle-rectangle decomposition of the vehicle area) are referred to as "rapid collision detection" or "rapid collision estimation". In addition, the invariance of the circles upon rotation, and the introduction of axis-aligned rectangles in each oriented vehicle, makes the algorithm faster.

In the real-world application, the vehicle position and the occupancy map are calculated with dynamic and/or static objects for each image and/or in each time segment by the sensors and the present method. Based on this information, during trajectory tracking, the vehicle area of the vehicle is checked for collisions at each time segment for the remaining part of the trajectory. If there is a collision prediction—that is, the above sum which is calculated is not equal to zero—then the vehicle carries out either measured braking or emergency braking of the vehicle, depending on the distance to the predicted collision.

According to a further preferred embodiment, it is provided that the circle decomposition is carried out exactly once. Equally advantageously, the rectangle decomposition is carried out exactly once.

This means that only the information obtained is used for later applications without the need to carry out a new calculation. The corresponding values and calculations are stored in the memory unit for later use.

Further advantageous embodiments result from the dependent claims.

Additional objects, advantages and expedient uses of the present invention can be found in the following description in conjunction with the drawings. In the drawings:

FIG. 1 shows the geometric representation of a vehicle area according to the prior art;

Figure 2A:
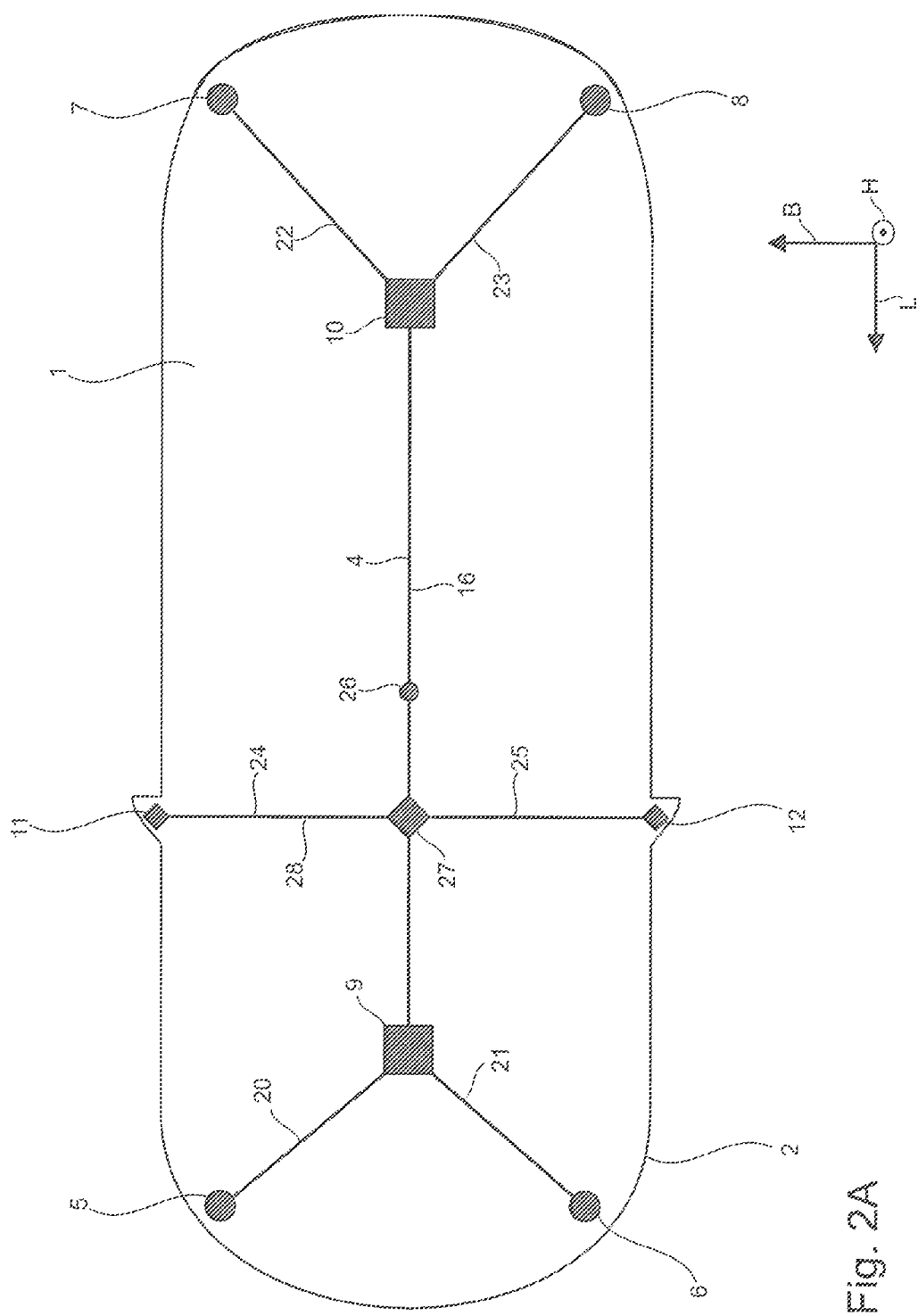
FIG. 2A is a medial axis transformation and point classification.

In the drawings, identical components are always provided with the same corresponding reference signs. For the sake of clarity, in some of the drawings, components that have been identified elsewhere may not be provided with a reference sign.

FIG. 1 shows a geometric representation of a vehicle area 1 with a boundary 2, wherein a boundary frame 3 is provided in the form of a rectangle which surrounds the vehicle area 1. The boundary frame 3 has been covered by means of a circle decomposition in such a way that a fixed number of circles is provided, in this case 10 circles, with a fixed radius.

As can be seen, a corresponding area exceedance value 17 is shown for each circle, and is relatively large in relation to the vehicle area 1 of the vehicle—in the present case, approximately one third of the area of each circle, and a considerable amount in the front region and in the rear region—such that it is necessary to maintain large distances between an object and the vehicle to prevent the detection of a collision, which is disadvantageous when maneuvering or parking.

Accordingly, the total area exceedance value, which can for example be formed by the sum of the individual area exceedance values, is considerably too large.

According to the present invention, the entire area exceedance value is to be minimised by the method according to the invention, in order to be able to improve the collision detection.

In the following drawings, the method according to the invention is described in accordance with a particularly preferred embodiment.

FIG. 2A shows a vehicle area skeleton 4 of the vehicle area 1, which was obtained by means of a medial axis transformation (MAT). In the present case, the vehicle area skeleton 4 comprises a first skeleton connecting line 16, a first front skeleton connecting line 20, a second front skeleton connecting line 21, a first rear skeleton connecting line 22, a second rear skeleton connecting line 23, a first lateral skeleton connecting line 24, and a second lateral skeleton connecting line 25.

Furthermore, a point classification has been carried out, the points having been classified with respect to a vehicle center 26, wherein the point classification is performed from the vehicle center 26 in such a way that the points with the greatest distances from the vehicle center 26 are defined as the corner region points, and the points of the vehicle center which represent a Y node or are located near a Y node are defined as the wheelbase points. A first front corner region point 5, a second front corner region point 6, a first rear corner region point 7, a second rear corner region point 8, a first lateral corner region point 11, a second lateral corner region point 12, a front wheelbase point 9, and a rear wheelbase point 10 were obtained in this process.

The first front corner region point 5 and the front wheelbase point 9 form the edge points of the first front skeleton connecting line 20, the second front corner region point 6 and the front wheelbase point 9 form the edge points of the second front skeleton connecting line 21, the first rear corner region point 7 and the rear wheelbase point 10 form the edge points of the first rear skeleton connecting line 22, and the second rear corner region point 8 and the rear wheelbase point 10 form the edge points of the second rear skeleton connecting line 23.

The line connecting the first lateral corner region point 11 and the second lateral corner region point 12 corresponds to a lateral skeleton connecting line 28, wherein the first lateral skeleton connecting line 16 and the lateral skeleton connecting line 28 intersect at a first point 27, wherein a first lateral skeleton connecting line 24 is formed by the skeleton connecting line between the first point 27 and the first corner region point 11, and a second lateral skeleton connecting line 25 is formed by the skeleton connecting line between the first point 27 and the second lateral corner region point 12.

The first lateral corner region point 11 and the second corner region point correspond to each of the exterior mirrors of the vehicle, respectively.

The term "vehicle center 26", indicated by the coordinates $(x_c, y_c)$, is used to mean an average of the skeleton points, wherein the set of skeleton points $P_s(x_s, y_s)$, represented by:

$$(x_c, y_c) = \left(\frac{x_{s,max} + x_{s,min}}{2}, \frac{y_{s,max} + y_{s,min}}{2}\right),$$

wherein $x_{s,max}$ is the maximum value and $x_{s,min}$ is the minimum value of the x-coordinate, and $y_{s,max}$ is the maximum value and $y_{s,min}$ is the minimum value of the y-coordinate.

The term "Y node" is used to designate the point at which the lines of the Y meet.

In addition, further points may be classified which correspond to lateral corner region points which correspond to the position of the mirrors of the vehicle. The lateral corner region points are those points which are at a distance from the center of the vehicle and do not correspond to any other corner region point.

A subsequent method step describes performing a circle decomposition of the vehicle area, in which each circle of the circle decomposition has a maximum area exceedance value.

According to the invention, a first circle 13 and a second circle 14 are generated, wherein the first circle 13 and the second circle 14 have a first radius 18. The first radius 18 is dependent on a vehicle width 29 and on the maximum area exceedance value. The vehicle width 29 corresponds to an extension of the vehicle in a width direction B, but preferably without taking the exterior mirrors into account.

The first radius 18 is then to be selected according to the vehicle width specifications and the maximum area exceedance value.

Figure 2B:
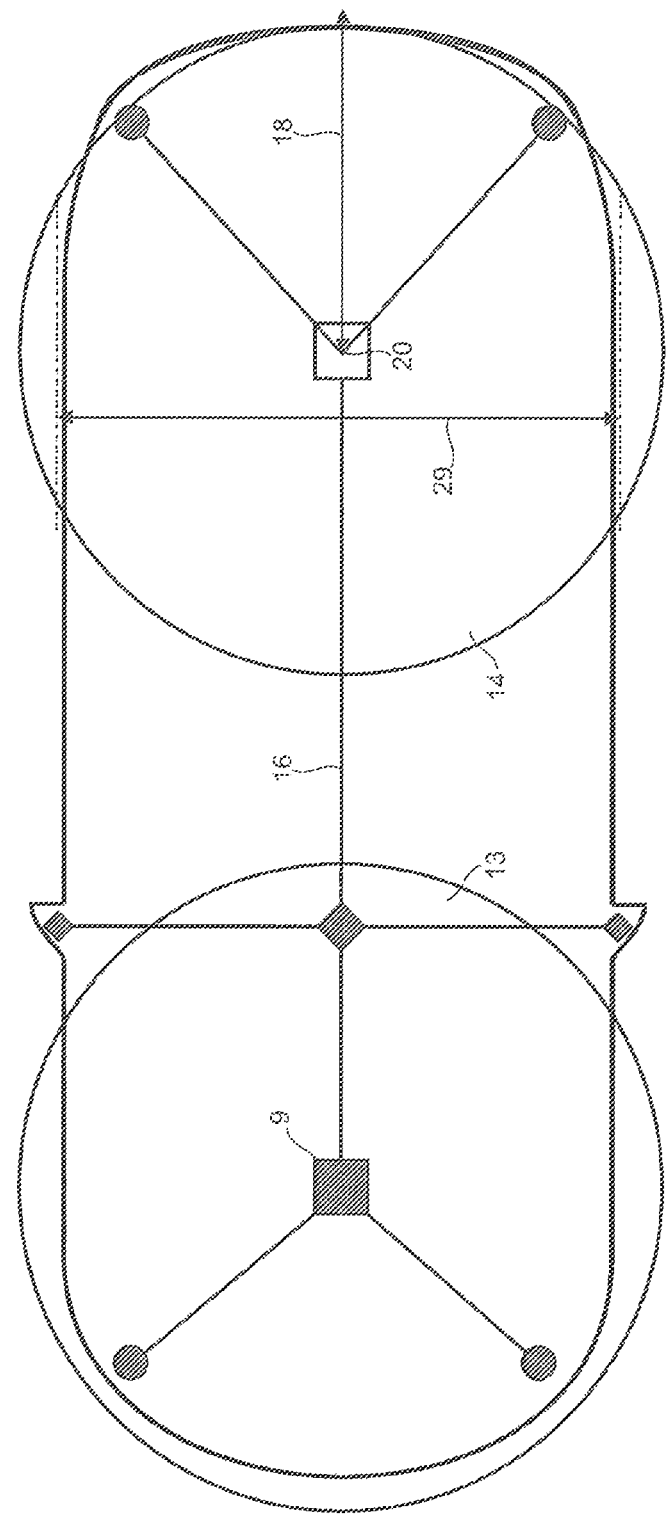
FIG. 2B shows the process of generating the first and second circles.

As can also be seen from FIG. 2B, the area assigned to the first skeleton connecting line 16 is not yet covered by the first circle 13 and the second circle 14, such that further circles are generated, beginning with a third circle 15.

In the present case, proceeding from the second circle 14, it can be seen that the second circle 14 intersects the boundary 2 at a minimum of two points of intersection, as a result of the requirement for the first radius 18—a first point of point of intersection 30 and a second point of point of intersection 31. These points of intersection 30, 31 are opposite each other with respect to the first skeleton connecting line 16.

Figure 2C:
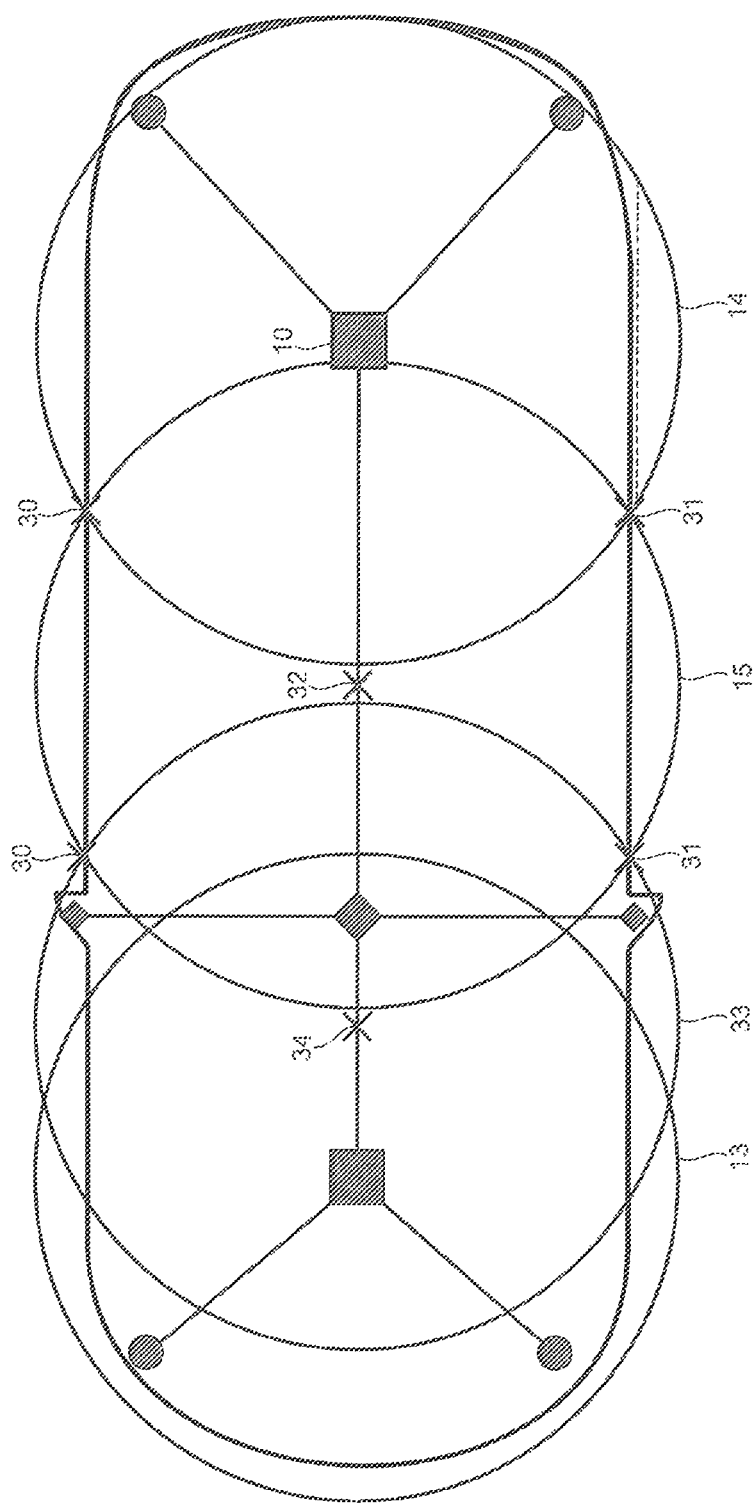
FIG. 2C shows the process of generating n-th circles.

The third circle 15 can be easily constructed proceeding from the points of intersection 30, 31, with a center 32 and the first radius 18, as shown in FIG. 2C.

After the third circle is generated, a verification step is carried out to verify that the area assigned to the first skeleton connecting line 14 is completely covered. This is not the case here, such that a fourth circle 33 with a center 34 must be generated. In this case, proceeding from the points of intersection 30, 31 of the third circle 15 with the boundary 2, the center 34 is determined, and the fourth circle 33 with the first radius 18 is generated.

If necessary, additional circles could be generated with the same method, until the entire area assigned to the first skeleton connecting line 16 is covered.

The remaining areas to be covered, assigned to the front, rear and lateral skeleton connecting lines 20, 21, 22, 23, 24, 25, 28, must accordingly still be completely covered.

Figure 2D:
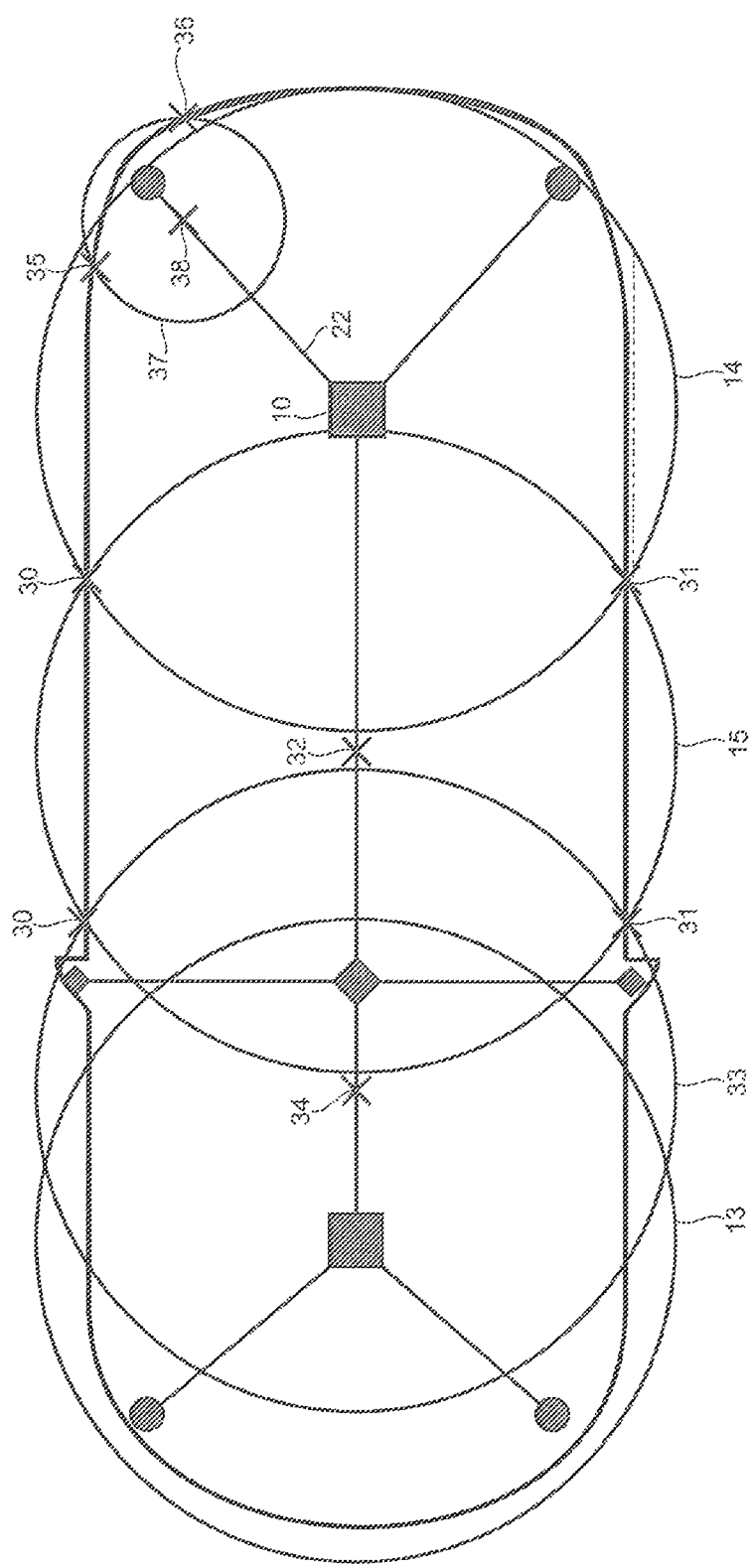
FIG. 2D shows the process of generating the first rear circle.

The procedure for the first rear skeleton connecting line 22 is described purely by way of example below in conjunction with FIG. 2D. The procedure for the other skeleton connecting lines 20, 21, 23, 24, 25, 28 is to be carried out analogously.

The second circle 14 further intersects the boundary 2 at a third point of intersection 35 and at a fourth point of intersection 36, as a result of which a center of the first rear circle 37 can be determined. The third point of intersection 35 and the fourth point of intersection 36 are opposite each other with respect to the first rear skeleton connecting line 22.

The center 38 of the first rear circle 37 is determined as a function of the points of intersection 35, 35, the position of the center on the first rear skeleton connecting line 22, and a minimum radius. The radius of the first rear circle 37 is iteratively increased until the requirement of the maximum area exceedance value is satisfied.

It is preferably provided that rear circles which lie in the previously formed circles of the first skeleton connecting line 16 are disregarded—that is, they are not generated. Rather, further circles of the first rear skeleton connecting line 22 are generated iteratively.

Figure 2E:
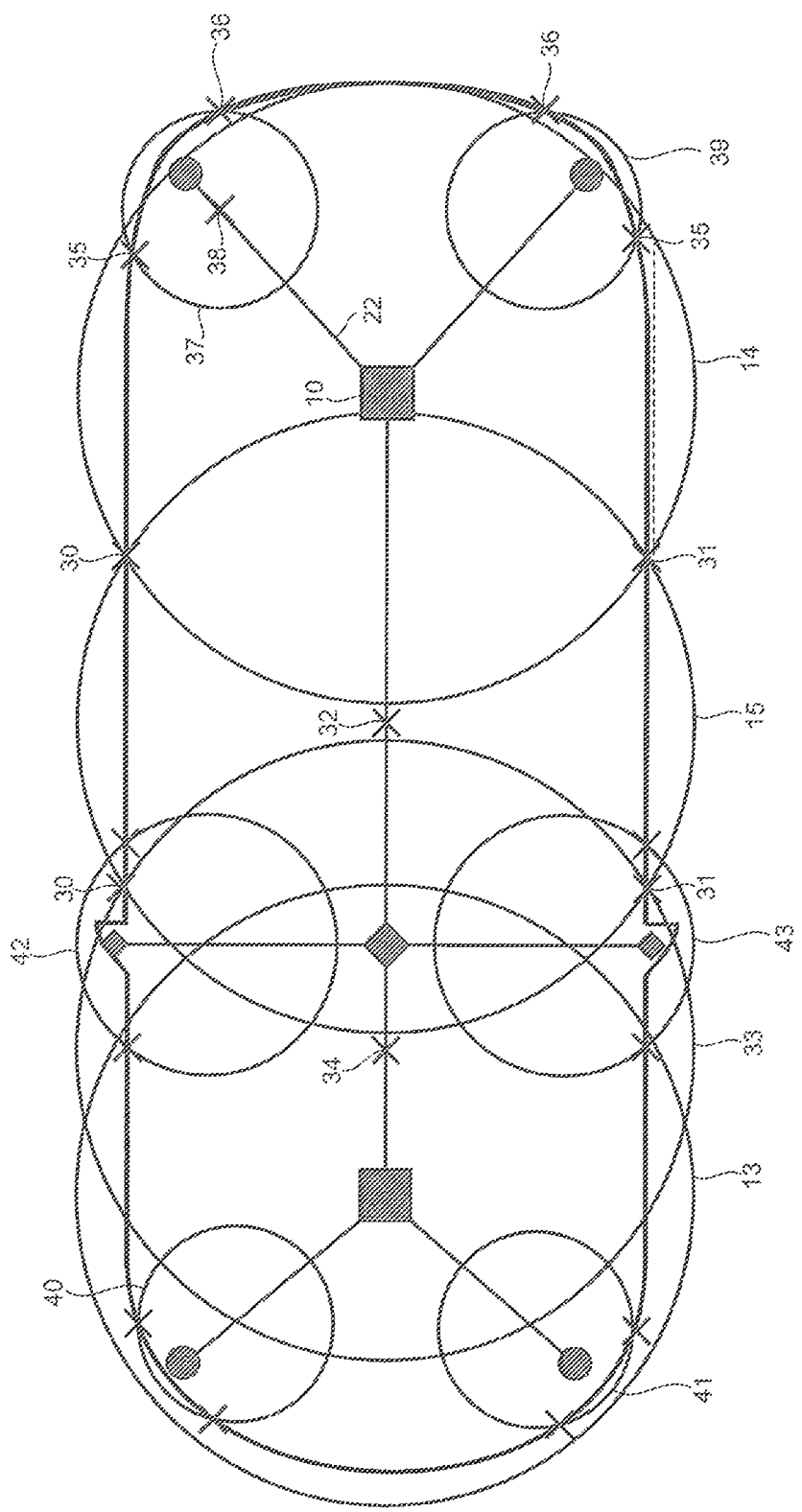
FIG. 2E shows the process of complete circle decomposition of the vehicle area.

The complete circle decomposition is shown in FIG. 2E.

After the vehicle area 1 has been decomposed into circles, it is particularly preferably provided that the generated circles are further simplified by means of a rectangle decomposition.

Particularly preferred is a rectangle decomposition of a circle which is performed in such a way that each circle is covered by rectangles.

In this case, the minimum radius must be selected, optionally as a function of the grid resolution, in such a way that a circle can be represented by at least two rectangles.

Figure 2G:
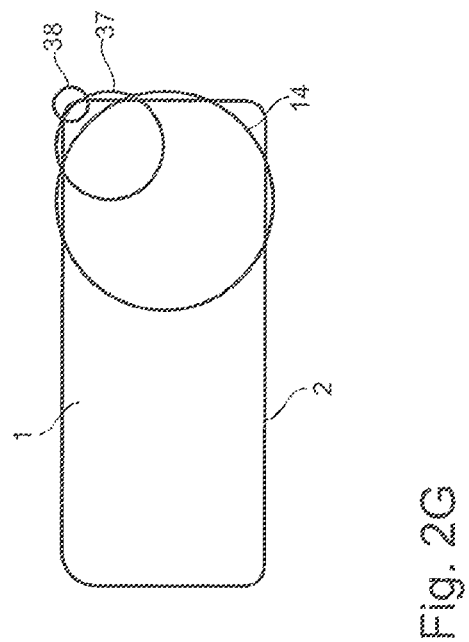
FIG. 2G shows the schematic representation according to FIG. 2F, and the determination of a second rear circle.
Figure 2F:
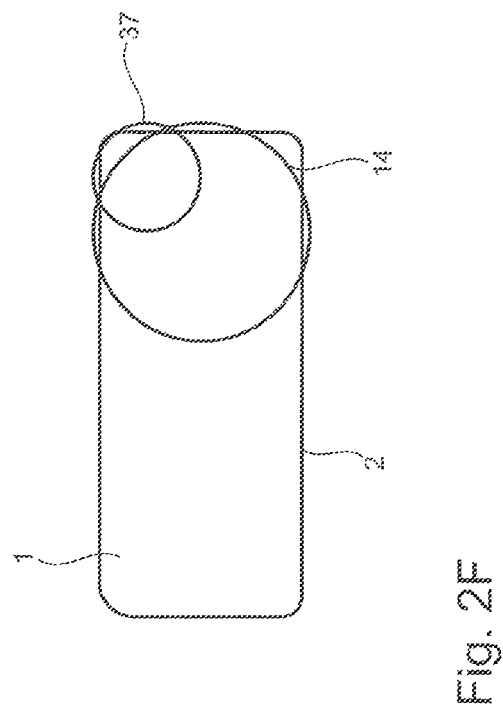
FIG. 2F shows the schematic representation of the coverage of a rear skeleton connecting line, and the determination of a first rear circle.

FIG. 2F shows an example in which a plurality of rear circles are necessary in order to completely cover the area assigned to the corresponding rear skeleton connecting line (not shown here), since the first rear circle 37 does not completely cover it, since the maximum area exceedance value condition is already fulfilled. Therefore, in order to completely cover the area assigned to the rear skeleton connecting line, a further rear circle, the second rear circle 39, of the corresponding rear skeleton connecting line is determined, as can be seen in FIG. 2G.

Figure 3:
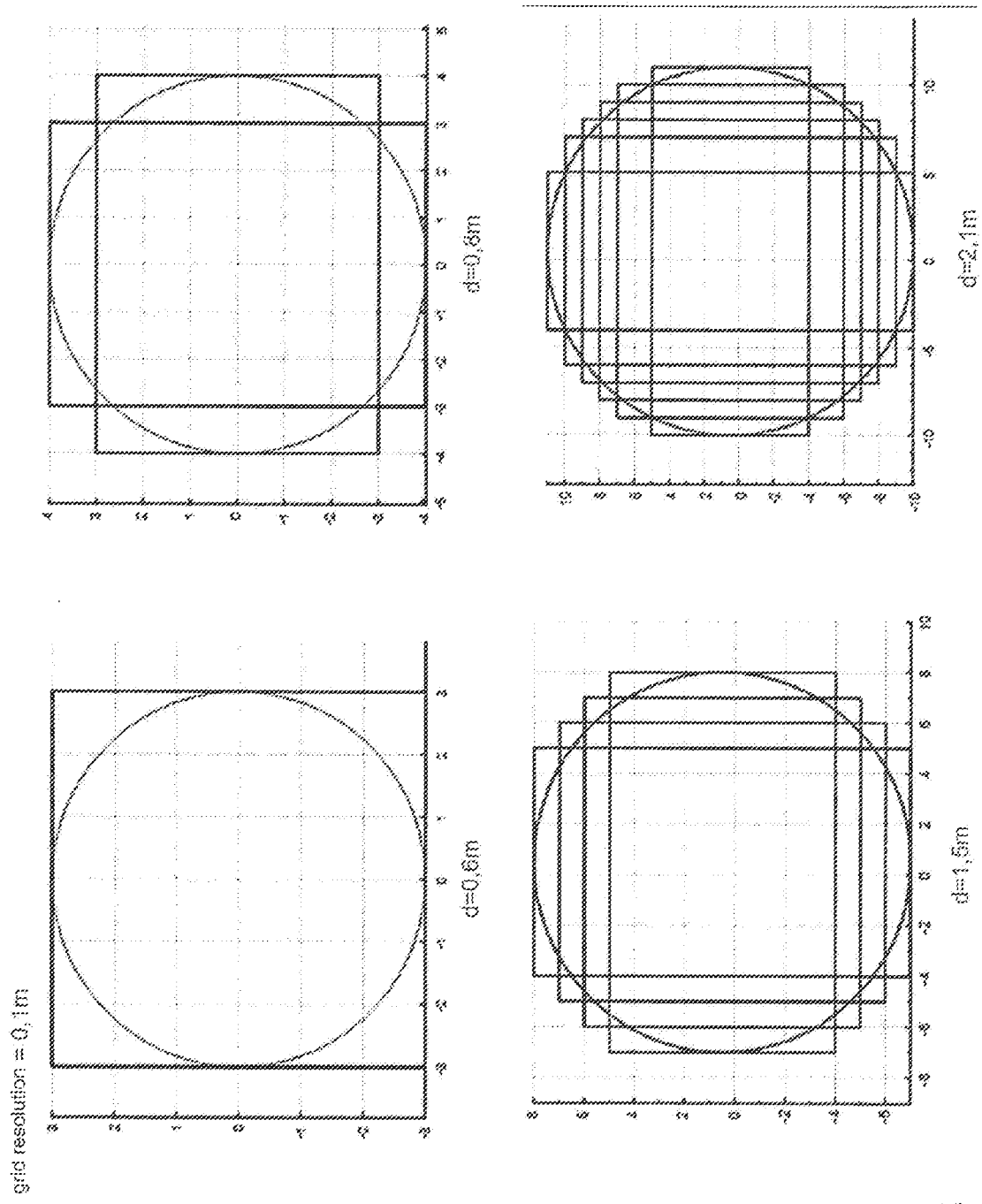
FIG. 3 shows the determination of the minimum radius.

The significance of this is shown in FIG. 3, wherein different circles with corresponding radii are shown for an example of a grid with a resolution of 0.1 m.

As can be seen, for the circle with a diameter of 0.6 m, the circle is represented by a single rectangle, since each cell lies at least partially within the circle. This is no longer the case with the other, larger diameters, such that each circle can be covered by at least two rectangles.

The idea behind a minimum circle radius is to minimise the total number of circles. According to the invention, the proposed method tries to cover the vehicle area 1 by means of a minimum number of circles within permitted boundary conditions, such as the maximum area exceedance value and the minimum radius.

Figure 4:
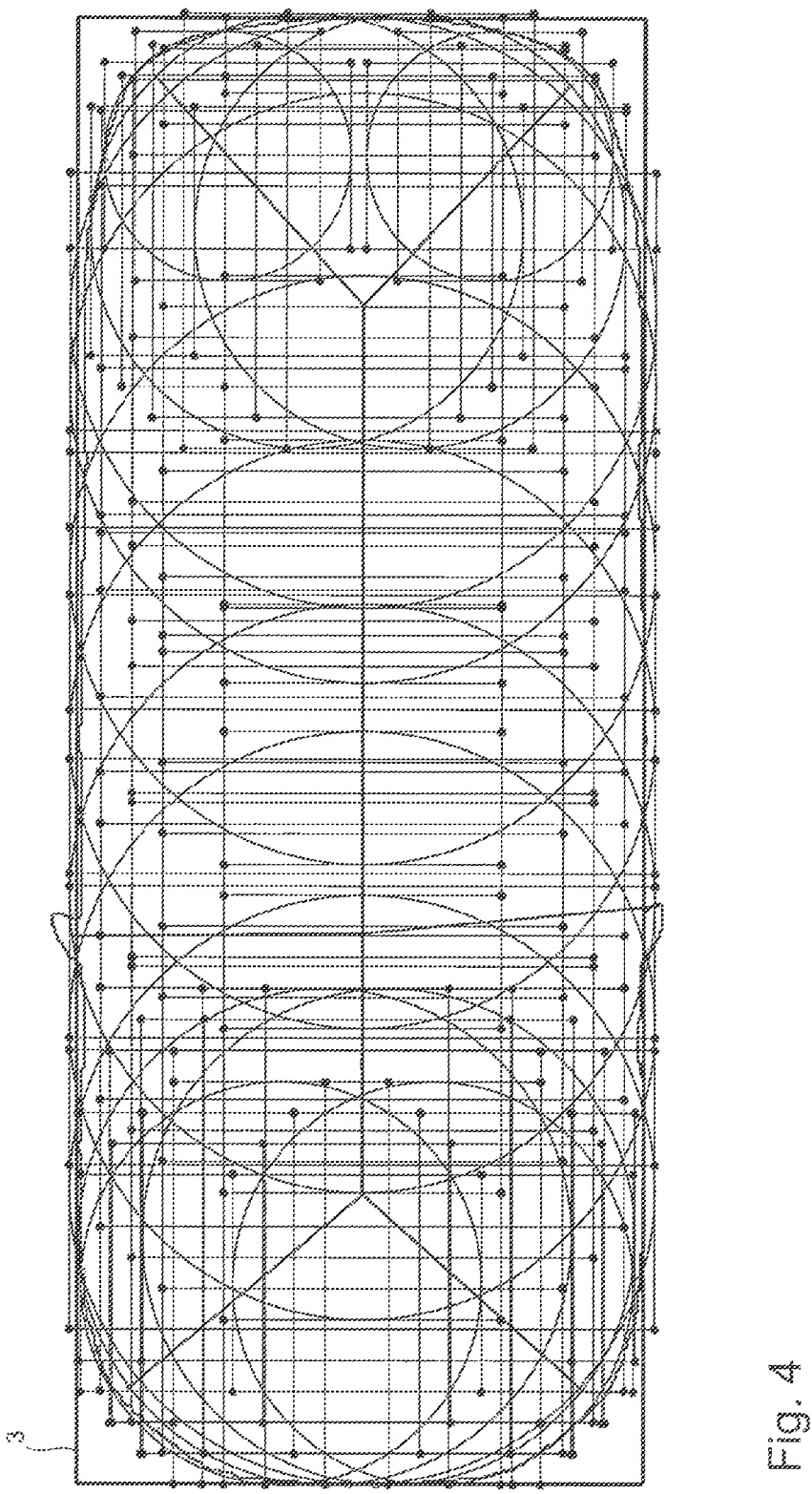
FIG. 4 shows the rectangle decomposition of the circle decomposition according to FIG. 2E.

FIG. 4 shows the circle decomposition of the vehicle area 1 with a rectangle decomposition that has been carried out. As can be seen from a comparison with FIG. 1, the coverage of the vehicle area 1 is selected to be significantly smaller, as is also shown by the inclusion of the boundary frame 3. The vehicle areas 1 with the boundary 2 and the boundary frame 3 of FIGS. 1 and 4 are identical, such that the difference from the prior art, shown in FIG. 1, can be clearly seen.

A further advantage of the illustrated decomposition and coverage of the vehicle area 1 is that circles are invariant upon rotation, such that it is only necessary to multiply the center of a circle by a rotation matrix for it to adapt to a movement of the vehicle.

The total calculation time for a collision detection can be reduced by the decomposition into rectangles, since only a few parameters have to be used for the calculation.

Generally speaking, an occupancy map was created by the circle-rectangle decomposition, by means of which a possible collision can be indicated.

In this case, the occupancy map is monitored by means of sensors, which are arranged on or in the vehicle, in each time segment. The sensors are designed and provided in particular to detect distances.

The various embodiments with all their features can be combined and exchanged in any manner.

All features disclosed in the application documents are claimed as essential to the invention, provided that they are, individually or in combination, novel over the prior art.

LIST OF REFERENCE SIGNS 1 vehicle area
2 boundary
3 boundary frame
4 vehicle area skeleton
5 first front corner region point
6 second front corner region point
7 first rear corner region point
8 second rear corner region point
9 front wheelbase point
10 rear wheelbase point
11 first lateral corner region point
12 second lateral corner region point
13 first circle
14 second circle
15 third circle
16 first skeleton connecting line
17 maximum area exceedance value
18 first radius
20 first front skeleton connecting line
21 second front skeleton connecting line
22 first rear skeleton connecting line
23 second rear skeleton connecting line
24 first lateral skeleton connecting line
25 second lateral skeleton connecting line
26 vehicle center
27 first point
28 lateral skeleton connecting line
29 vehicle width
30 first point of intersection
31 second point of intersection
32 center of the third circle
33 fourth circle
34 center of the fourth circle
35 third point of intersection
36 fourth point of intersection
37 first rear circle
38 center of the first rear circle
39 second rear circle
40 first front circle
41 second front circle
42 first lateral circle
43 second lateral circle

The invention claimed is:

1. Method for a vehicle area geometric representation of a vehicle for collision detection, wherein the vehicle area has a boundary, comprising the method steps of:

(a) performing a medial axis transformation of the vehicle area to generate a vehicle area skeleton, and performing a point classification of points of the vehicle area skeleton to determine front corner region points and rear corner region points, and a front wheelbase point and a rear wheelbase point;

(b) performing a circle decomposition of the vehicle area, wherein each circle of the circle decomposition has a maximum area exceedance value, including:

(i) (I) generating a first circle having a first circle center, wherein the first circle center is the front wheelbase point and has a first radius, and generating a second circle having a second circle center, wherein the second circle center is the rear wheelbase point and has the first radius wherein the connection between the front wheelbase point and the rear wheelbase point corresponds to a first skeleton connecting line;

(II) performing a verification step to determine whether a first area of the vehicle area assigned to the first skeleton connecting line, with the rear wheelbase point and front wheelbase point as end points, is completely covered;

(III) if the verification step is negative, generating an n-th circle, where n=3, . . . , on the first skeleton connecting line, with the first radius; incrementing n and performing step (i)-(II) again;

(ii) proceeding from the front wheelbase point towards an $n_v$-th front corner region point, $n_v$=1, 2, . . . , along an $n_v$-th front skeleton connecting line between the front wheelbase point and the $n_v$-th front corner region point;

(I) generating an $n_v$-th front circle on the $n_v$-th front skeleton connecting line, with a minimum radius, and iteratively adapting the minimum radius of the $n_v$-th front circle until the maximum area exceedance value condition is satisfied;

(II) performing a verification step to determine whether a second area of the vehicle area assigned to the $n_v$-th front skeleton connecting line is completely covered;

(III) if the verification step is negative, generating a (m+1)-th front circle, with the minimum radius, on the $n_v$-th front skeleton connecting line, and iteratively adapting the minimum radius of the (m+1)-th front circle until the maximum area exceedance value condition is satisfied, incrementing $n_v$, and performing step (ii)-(II) again;

(iii) proceeding from the rear wheelbase point towards an $n_h$-th rear corner region point, $n_h$=1, 2, . . . , along an $n_h$-th rear skeleton connecting line between the rear wheelbase point and the $n_h$-th rear corner region point;

(I) generating an $n_h$-th rear circle, with the minimum radius, and iteratively adapting the minimum radius of the $n_h$-th rear circle until the maximum area exceedance value condition is satisfied;

(II) performing a verification step to determine whether a third area of the vehicle area assigned to the $n_h$-th rear skeleton connecting line is completely covered;

(III) if the verification step is negative, generating an ($n_h$+1)-th rear circle, with the minimum radius, on the n-th rear skeleton connecting line and iteratively adapting the minimum radius of the ($n_h$+1)-th rear circle until the maximum area exceedance value condition is satisfied, incrementing $n_h$, and performing step (iii)-(II) again, wherein; upon a movement of the vehicle, an integral image of an occupancy map is calculated, wherein the movement of the vehicle results in a transformation matrix being applied to each circle.

2. Method according to claim 1,
wherein
when the point classification is performed, a first and a second lateral corner region point are defined, wherein the connecting line between the first and the second lateral corner region point corresponds to a lateral skeleton connecting line, wherein a first lateral skeleton connecting line and a second lateral skeleton connecting line intersect at a first point, wherein the first lateral skeleton connecting line is formed by the skeleton connecting line between the first point and the first corner region point, and the second lateral skeleton connecting line is formed by the skeleton connecting line between the first point and the second lateral corner region point,
wherein, proceeding from the first point towards the first lateral corner region point along the first lateral skeleton connecting line, or proceeding from the first point towards the second lateral corner region point along the second lateral skeleton connecting line:
- (I) generating an $n_s$-th lateral circle on the first or second lateral skeleton connecting line, with the minimum radius, and iteratively adapting the minimum radius of the $n_s$-th lateral circle until the maximum area exceedance value condition is satisfied;
- (II) performing a verification step to determine whether a fourth area of the vehicle are assigned to the first or second lateral skeleton connecting line is completely covered;
- (III) if the verification step is negative, generating an $(n_s+1)$-th lateral circle with the minimum radius, on the first or second lateral skeleton connecting line, and iteratively adapting the minimum radius of the $(n_s+1)$-th lateral circle until the maximum area exceedance value condition is satisfied, incrementing $n_s$ and performing step (II) again.

3. Method according to claim 1,
wherein
in the event of a negative verification step, the third circle is determined proceeding from the first circle, wherein the first circle intersects the boundary at a minimum of four points of intersection, wherein a first point of intersection and a second point of intersection are opposite each other with respect to the first skeleton connecting line, and wherein a center of the third circle is determined by means of the first and the second point of intersection;
or, in the event of a negative verification step, the third circle is determined proceeding from the second circle, wherein the second circle intersects the boundary at a minimum of four points of intersection, wherein a first point of intersection and a second point of intersection are opposite each other with respect to the first skeleton connecting line, and wherein a center of the third circle is determined by means of the first and the second point of intersection;
and wherein, in the case of a repeated negative verification step, the (n+1)-th circle is determined proceeding from the n-th circle, wherein the n-th circle intersects the boundary at a minimum of four points of intersection, wherein a first point of point of intersection and a second point of point of intersection are opposite each other with respect to the first skeleton connecting line, and wherein a center of the (n+1)-th circle is determined by means of the first point of point of intersection and the second point of point of intersection.

4. Method according to claim 1,
wherein
proceeding from the first circle, the first front circle is determined, wherein the first circle intersects the boundary at a minimum of four points of intersection, wherein a third point of intersection and a fourth point of intersection are opposite each other with respect to the first front skeleton connecting line, and wherein a center of the first front circle is determined by means of the third and fourth points of intersection, and wherein in the event of a negative verification step, proceeding from the $n_v$-th front circle, the $(n_v+1)$-th circle is determined, wherein the $n_v$-th circle intersects the boundary at a minimum of two points of intersection, wherein a first point of intersection and a second point of intersection are opposite each other with respect to the first front skeleton connecting line, wherein the center of the $(n_v+1)$-th front circle is determined by means of the first point of intersection and the second point of intersection.

5. Method according to claim 1,
wherein
the first radius corresponds to a maximum permitted radius, which is formed as a function of a vehicle width and the maximum area exceedance value.

6. Method according to claim 1,
wherein
the circle decomposition has a total area exceedance value relative to the vehicle area, wherein the total area exceedance value is dependent on the maximum area exceedance value for each circle, a grid resolution and a minimum radius for each circle.

7. Method according to claim 1,
wherein
the point classification is performed from a prespecified vehicle center in such a way that the points with the greatest distances from the vehicle center are defined as the corner region points.

8. Method according to claim 1,
wherein
after the circle decomposition has been carried out, a rectangle decomposition of each circle is carried out in such a way that each circle is covered by rectangles, wherein each rectangle is checked for occupancy by means of rapid collision detection.

9. Method according to claim 1,
wherein
the circle decomposition is performed exactly once.

* * * * *